UNITED STATES PATENT OFFICE.

GEORGE W. HATCH, OF PRINCETON, ILLINOIS.

IMPROVEMENT IN TANNING.

Specification forming part of Letters Patent No. 33,388, dated October 1, 1861.

*To all whom it may concern:*

Be it known that I, GEO. W. HATCH, of Princeton, in the county of Bureau and State of Illinois, have invented a new and useful Improvement in the Manufacture of Leather; and I do hereby declare that the following is a full, clear, and exact description thereof.

The nature of my invention consists in the use of the plant melilotus (sweet-scented clover) in connection with terra-japonica, cutch, tan-bark, or other usual tanning material used in the tanning of or manufacture of leather.

To enable others skilled in the art to make, construct, and use my invention, I will proceed to describe its construction and operation.

I extract the virtue from the melilotus plant by steeping in water or tan-liquor, and mix the same with japonica, cutch, or other tan in the proportion of four pounds green or two pounds dry plant to each side of upper-leather, or accordingly to heavier or lighter stock, increasing the amount of melilotus in the proportion of tan used if greater softness and toughness of leather is desired, or decreasing the proportion of melilotus as greater firmness of leather is desired, put the rawhide into the liquor of said melilotus and tan combined, or into each separately, changing from one to the other until tanned; and also drench tanned leather in the liquor of said melilotus to soften the leather and likewise to improve the color to that of oak-tanned leather. This melilotus plant should be gathered when in the flower or when about going into the flower. It is well known by tanners that terra-japonica or cutch are powerful astringents, and that used alone tend to make leather harsh and brittle, and thus liable soon to crack and break to pieces in wear; but using this melilotus plant in connection with them has an admirable effect to neutralize their harsh or caustic nature, and thus to improve their conditions in tanning leather.

I am well aware of the long and general use of tan-bark, terra-japonica, cutch, and the other usual tannins, which I do not claim; but I do claim—

The use of said melilotus plant, as herein specified, in the manufacture of leather.

GEO. W. HATCH.

Witnesses:
A. WARFIELD,
J. JOHNSON CLOSSON.